April 28, 1959
C. F. SCHREIBER
2,883,808
RADIUS GRINDING FIXTURE
Filed Oct. 10, 1956
2 Sheets-Sheet 1
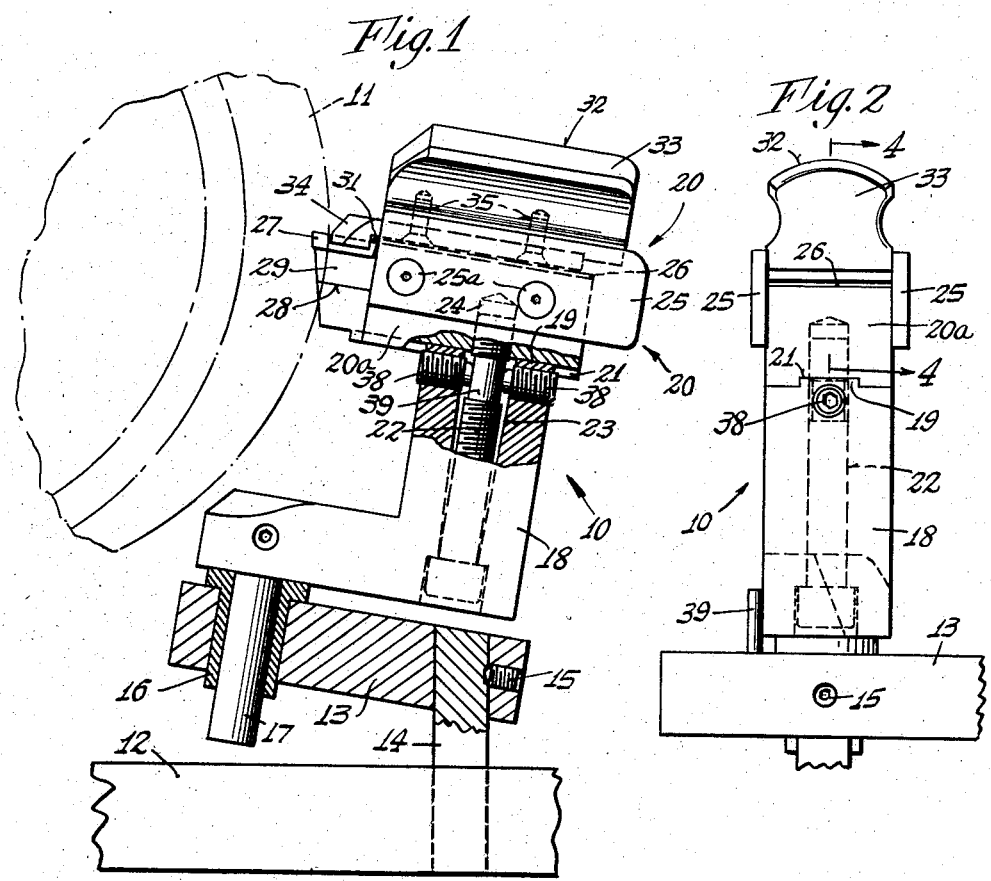
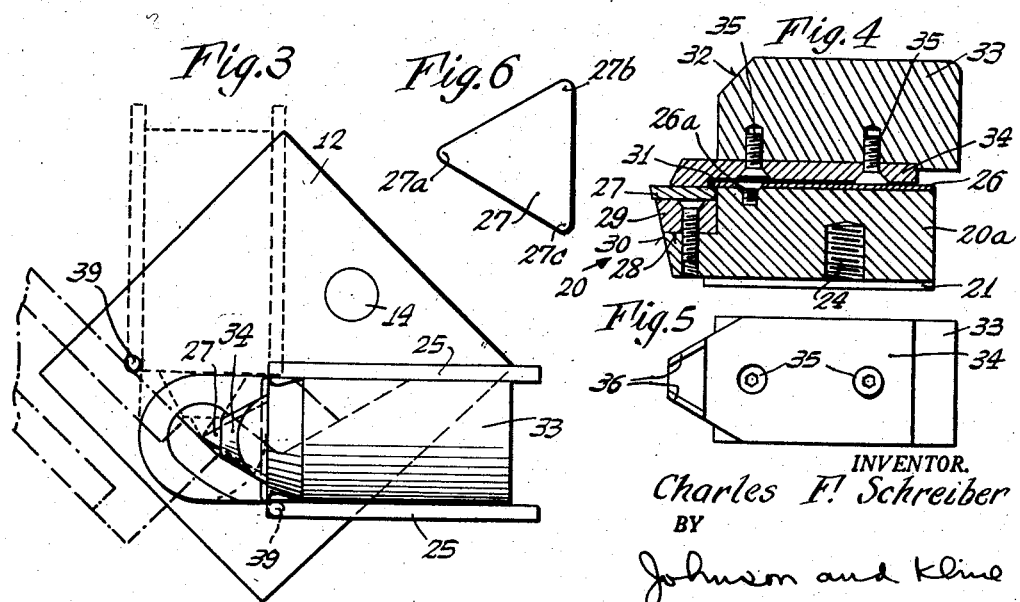
INVENTOR.
Charles F. Schreiber
BY
Johnson and Kline
ATTORNEYS April 28, 1959 C. F. SCHREIBER 2,883,808
RADIUS GRINDING FIXTURE
Filed Oct. 10, 1956 2 Sheets-Sheet 2
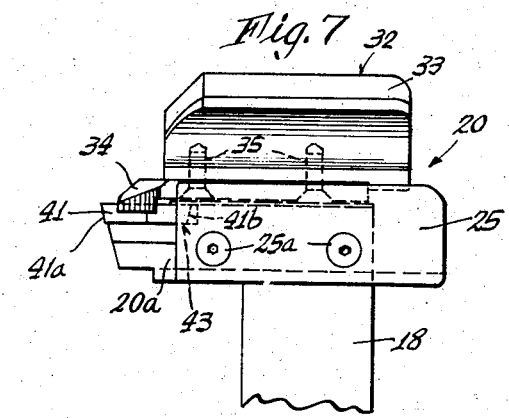
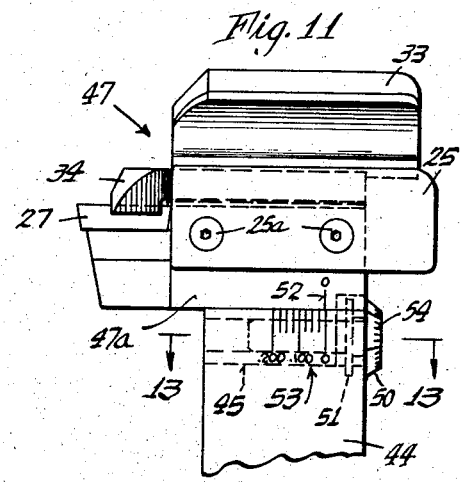
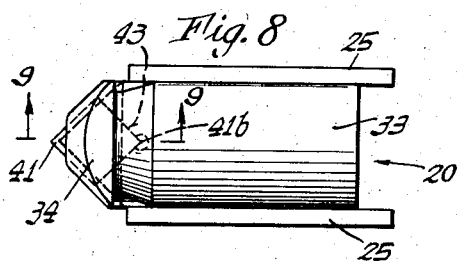
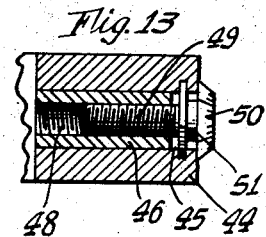
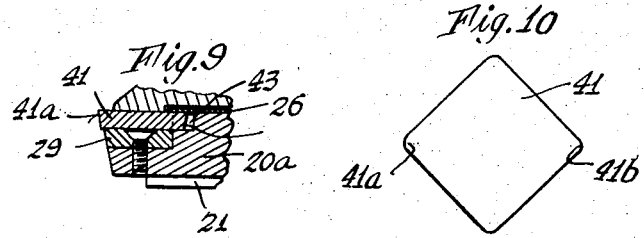
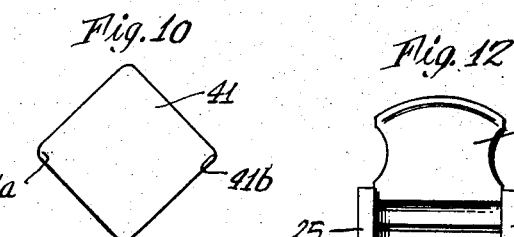
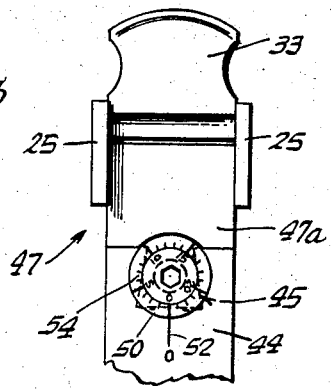
INVENTOR.
Charles F. Schreiber
BY
Johnson and Kline
ATTORNEYS United States Patent Office 2,883,808
Patented Apr. 28, 1959

2,883,808

RADIUS GRINDING FIXTURE

Charles F. Schreiber, Stratford, Conn.

Application October 10, 1956, Serial No. 615,085

7 Claims. (Cl. 51—218)

The present invention relates to a tool or fixture and, more particularly, to such a device which is utilized for grinding a radius on the corners of throw-away cutting inserts.

Throw-away inserts are generally formed of tungsten carbide, ceramic, high speed steel and other hard cutting materials and usually have a triangular or square plane shape. These inserts are generally provided by the manufacturer with either no radius at each corner or with only a small number of prefixed radii. For each kind of material there is a specific optimum radius of the cutting tool and also the radius may vary between different types of cut or cutting speed for the same material. When it is required to use any other than prefixed radius on an insert for a cutting operation, it is necessary to have that size of optimum radius in stock or to grind the optimum radius on an available insert.

It is an object of the present invention to provide a tool which can accurately grind a desired radius on the corners of a throw-away insert with speed and facility.

Another object of the present invention is to provide a tool of the above-disclosed type in which only a simple operation is necessary to grind the radius and in which no special skill or talents are required on the part of the operator.

A further object of the instant invention is to provide a fixture for holding either triangular or square inserts in which the insert is automatically self-centered on the fixture.

Another object of the present invention is to provide a tool in which the change from grinding a square insert to a triangular or vice versa may be quickly and easily accomplished.

A further object of the present invention is to provide a tool of the above-disclosed type in which adjustments are provided which compensate for variations in the dimensions of the insert, permit varying the size of the radius and permit varying the angle at which the cutting edge of the insert is undercut.

A feature of the present invention resides in providing an insert holder which is pivoted for movement in an arc. The center of the arc is in line with the grinding face of the grinding wheel and the corner of the insert on which the radius is to be formed is positioned in adjusted relation to the center of the arc. Accordingly, a simple adjustment to shift the corner of the insert with relation to the face of the grinding wheel is the only step necessary to permit adjusting the size of the radius. In addition, the insert is held self-centered on the insert holder by means of a pair of rearwardly diverging lips which position the corner to be ground in line with the center of the arc. In one embodiment of the invention, a scale is utilized to give a visible indication of the size of the radius.

Other features and advantages will hereinafter appear.

Referring to the drawing:

Figure 1 is an elevation of the radius grinding tool of the present invention with portions thereof shown in section.

Figure 2 is an end elevation of Figure 1.

Fig. 3 is a plan view of Figure 1 showing the tool at two extremes of its path of movement.

Fig. 4 is a section taken on the line 4—4 of Fig. 2.

Fig. 5 is a view showing the undersurface of the insert clamping member.

Fig. 6 is a plan view of a triangular throw-away cutting insert.

Fig. 7 is a modification of the insert holder for use with a square insert.

Fig. 8 is a plan view thereof.

Fig. 9 is a detail taken on the line 9—9 of Fig. 8.

Fig. 10 is a plan view of a square throw-away cutting insert.

Fig. 11 is a view of another embodiment of the tool of the present invention.

Fig. 12 is an end elevation thereof.

Fig. 13 is a section taken on the line 13—13 of Fig. 11.

Referring to the drawing and, more particularly to Figs. 1 through 6 inclusive, the radius grinding fixture for throw-away inserts of the present invention is generally indicated by the reference numeral 10. The fixture in the instant embodiment is shown mounted on a platform 12 which supports a grinding wheel 11.

A base 13 of the fixture is provided with a pin 14 extending at an angle therefrom with the pin held in place by a set screw 15. The pin is force fitted into an aperture formed in the platform 12, though other well-known fastening means to hold the pin in position and prevent rotation thereof may be utilized. Remote from the pin 14 a bushing 16 is fitted into the base 13 and a pin 17 extends therethrough for pivotal movement therein. The bushing 16 extends perpendicular to the top and bottom surfaces of the base 13. The pin 17 is securely fastened to an L-shaped support member 18 at the end of one leg thereof and the end of the other leg of the support member is provided with a tongue 19. An insert holder, generally indicated by the reference numeral 20, includes an insert support 20a provided with a groove 21 on its undersurface which cooperates with the tongue 19. A bolt 22 extends through a tapered aperture 23 in the leg of the support 18 and threads into a tapped hole 24 in the groove of the insert support 20a. A side plate 25 is mounted on each side of the insert holder 20 as by screws 25a to define a U-shaped channel. A flat plate 26 is screwed, as by screws 26a, to the top surface of the insert support 20a at the bight of the channel.

A triangular insert 27, having corners 27a, 27b and 27c, is adapted to be positioned at the front end of the insert holder. To this end, the front end is provided with a step 28 on which an insert seat 29, which corresponds in shape to the insert but is just a little smaller, is located. The front end of the insert support 20a is preferably also triangular in shape and has a beveled front edge 30. The seat 29 is of less thickness than the cut-out portion and, accordingly, the plate 26 has a portion 31 projecting beyond the cut-out. This projection serves to hold the rear edge of the insert in place. An insert clamping member 32 is positioned in the U-shaped channel and has a handle 33 and a lower plate 34 which are connected together by screws 35. The forward edge of the plate 34 has a pair of downwardly extending lips 36 which diverge rearwardly and these lips are adapted to engage the sides of the throw-away insert.

In order to provide for adjusting the radius and also to compensate for variations in the dimensions of the throw-away insert, a pair of adjustment screws 38 are provided which contact a threadless portion 39 of the bolt 22.

In the operation of the device, the angle between the pin 14 and the base 13 is selected to be substantially the same as the undercut angle of the throw-away insert. Naturally, if there is no undercut on the insert then this pin would be perpendicular to the base 13 which can be created by having the bore in the base 13 in which the pin 14 fits parallel to the bushing 16. The insert 27, which is triangular in this embodiment of the insert holder, is positioned on the insert seat 29 with its back edge located below the projection 31 and abutting the straight edge of the insert support 20a. The clamping member 32 is positioned between the cheek plates 25 and moved downwardly and rearwardly so that the lips 36 engage the sides of the insert, centering it with respect to the axis of the insert holder 20 and also forcing its back side against the rear edge of the step 28 and under the projection 31. This centers the insert on the insert holder 20 so that the corner of the insert is located in line with the axis of pin 17, when a zero radius is to be ground. The distance the corner of the insert is moved towards the grinding wheel determines the radius being ground on the corner.

Referring to Fig. 3, the tool is positioned in the full line position and it is moved in an arc to the dotted line position and then back to the full line position. During this operation a radius will be formed on the forward corner of the triangular insert. There is also provided on the base 13, a pair of pins 39 which limit the pivotal movement of the holder. If, after examination, for example, by a shadowgraph, shows that the radius is too little or too large, variations therein may be made by adjustment of the set screws 38.

As shown in Figs. 4 and 5, the more rearward screw 35 which holds the plate 34 to the handle 33 has its head project about .010 above the plate 34 in order to provide for some variations in thickness of the throw-away insert 27 and also to insure that a downward force is exerted on the insert 27. Also this compensates for some variation in thickness of the cutting insert. The operator grasps the handle 33 nearer the forward end thereof than the rearward end and hence the member 32 pivots downwardly about the screw head onto the insert.

Referring to Figs. 7 through 10 inclusive the embodiment illustrated herein of the insert holder is substantially the same as previously described except that a square insert 41 may be ground with accuracy by using this embodiment. A U-cut 43 is formed in the front stepped end of the insert support 20a and into this V-cut is positioned an opposite corner 41b of a corner 41a whose radius is to be ground. The apex of the V-cut is substantially on the axis of the insert holder 20. Accordingly, this permits the depending lips of the insert clamping member to cause self-centering of the insert with respect to the insert holder. It will be appreciated that the apex of the V-cut is located on the center line of the insert holder 20.

Figs. 11 through 13 inclusive, disclose an embodiment of an insert holder generally indicated by the reference numeral 47 in which the radius of the corner of the insert may be accurately set by the use of a visible index. The end of a leg 44 of the L-shaped support member has a dovetail groove 45 into which a tongue 46, formed on an insert support 47a, fits for sliding movement. The tongue 46 has a threaded aperture 48 which mates with a micrometer screw 49. A head 50 of the screw 49 is located outside the leg 44 and a collar 51, positioned in grooves in the leg, hold the screw stationary when it is rotated and thus effectuates movement of the insert holder 47 with respect to the leg 44. Graduations 53, on the side of the leg, and 54 on the head of the screw are spaced so as to give an indication of the radius to be cut when combined with index marks 52 formed on the insert support 47a and the leg 44 respectively. Accordingly, rotation of the screw sets the radius at which the corner of the insert will be cut.

From the foregoing, it will be appreciated that there has been disclosed a fixture for grinding a radius on the corner of a throw-away insert. The fixture provides for self-centering of the insert on the fixture to assure accuracy of grinding with a minimum amount of effort and skill. In addition, adjustments are provided to permit varying the radius and in one embodiment a visible indication of the radius being ground is afforded.

Variations and modifications may be made within the scope of the claims and portions of the improvements may be used without others.

I claim:

1. A tool for grinding a radius on the corner of a throw-away cutting insert comprising an insert holder adapted to hold an insert with a corner of the insert to be ground positioned against a grinding wheel and including a clamping member having projections adapted to engage the sides of the insert forming the corner to self-center the insert on the holder, means for pivoting the insert holder in an arc, and means for moving the insert holder toward and away from the grinding wheel to permit adjusting the radius at which the corner is ground.

2. The invention as defined in claim 1 in which the end of the insert holder nearest the grinding wheel has a stepped portion provided with an overhanging projection and in which the insert is adapted to be placed on the stepped portion with the rear portion of the insert beneath the projection.

3. A tool for grinding a radius on a corner of a throw-away insert comprising an insert holder and means for mounting the insert holder for movement in an arc; said insert holder including an insert support, having a step formed in the front portion of the support nearest the arc onto which an insert is adapted to be positioned with a corner to be ground nearest the center of the arc and a projection overhanging the rear edge of the step; and an insert clamping member having a front portion spaced above the step and adapted to engage the top surface of the insert and having depending lips for engaging the sides of the insert forming the corner to be ground to center the insert on the insert holder.

4. The invention as defined in claim 3 in which the insert holder has a pair of upstanding side plates defining a U-shaped channel and in which the clamping member is removably positioned in the channel with the plates preventing sidewise movement of the clamping member.

5. The invention as defined in claim 3 in which the rear edge of the step is straight and against which the rear edge of a triangular insert is adapted to be positioned.

6. The invention as defined in claim 3 in which the rear edge of the step is formed with a V-shaped cut-out into which the opposite corner of a square insert is adapted to be positioned.

7. A tool for grinding a radius on the corner of a throw-away insert comprising a base, an L-shaped support member, an insert holder mounted on one leg of the support member, means connected between the other leg and the base for permitting rotative movement to enable the insert holder to move in an arc, a flat stepped surface on the end of the insert holder nearest the center of the arc for receiving a cutting insert with the corner of the insert to be ground positioned adjacent the center of the arc, and means for moving the insert holder on the leg to cause movement of the corner of the insert toward and away from the center of the arc to adjust the radius at which the corner is ground, in which the last-named means includes a bolt extending through a tapered aperture formed in the leg carrying the insert holder and having its end portion threaded into the insert holder; and in which there is at least one screw mounted in the one leg carrying the insert holder for movement perpendicular to the bolt and having an end portion bearing against the bolt.

References Cited in the file of this patent

UNITED STATES PATENTS

| | | |
|---|---|---|
| 1,538,174 | Davis | May 19, 1925 |
| 2,454,472 | Monkley | Nov. 23, 1948 |